United States Patent Office 3,634,226
Patented Jan. 11, 1972

3,634,226
BIOCHEMICAL PROCESS
Boston E. Witt, Santa Fe, and Homer A. Bennett, Clovis, N. Mex., assignors to Bacti Products, Inc.
No Drawing. Filed Jan. 5, 1968, Ser. No. 695,833
Int. Cl. C02c 1/02
U.S. Cl. 210—11                       6 Claims

ABSTRACT OF THE DISCLOSURE

A process of purifying human and industrial sewage by utilization of a gram negative mutant bacillus of the Providence group of Enterobacteriaceae ATCC 21160. The responsible bacterium has previously unrecognized specific metabolic characteristics which render it highly suitable, particularly in view of its lipolytic activity, for the deordorization, digestion and decontamination of sewage.

---

This invention relates generally to a process for biologically digesting sewage and particularly the lipids therein. More specifically the present invention relates to a process for the treatment of sewage to effect a significant deodorization thereof.

It is an object of the present invention to provide a novel process for biologically digesting and deodorizing sewage derived from human and industrial sources.

Another object of the present invention is to provide a novel biochemical process for the degradation of lipids oftentimes present in significant proportions in industrial sewage derived from meat and dairy product processing plants and the like.

A further object of the present invention is to provide a novel biochemical process for the clearing of in-plant sewage conduits and the like such as comprising, for example, non-edible fat discharge lines leading from a meat packing plant to a sewage lagoon.

Still another object of the present invention is to provide a novel process of treating sewage by utilization of a gram negative bacillus mutant of the Providence group of Enterobacteriaceae having previously unrecognized desirable metabolic characteristics which render the responsible bacterium highly suitable for the deodorization, digestion and decontamination of sewage.

Still another object of the present invention is to provide a novel sewage treatment process which is suitable for use in conjunction with sewage lagoons as well as more conventional municipal and industrial sewage treatment plants.

Still another object of the present invention is to provide a novel method of biologically deodorizing and significantly purifying sewage by the utilization of a mutant bacterium of the Providence group of paracolon bacteria of the family Enterobacteriaceae.

Further objects and aspects of the present invention will become apparent hereinafter.

The objects of this invention are accomplished by inoculating sewage to be treated with a viable culture of this organism of the Providence group, which inoculation is repeated at predetermined intervals to compensate for decreasing numbers of the responsible organism in the sewage due to natural over-growth and attendant death of some of the organisms. More particularly, the process of the present invention utilizes as an active bacterium a true-breeding mutant strain of paracolon bacteria believed to be of the family Enterobacteriaceae, Providence group, which is apparently not pathogenic and is characterized by being capable of metabolically deodorizing organic waste and solubilizing fats of animal origin. A culture of the responsible mutant organism has been deposited with the American Type Culture Collection (ATCC), Rockville, Md., and has been assigned the depository designation ATCC 21160. Growth characteristics generally characteristic of the responsible true-breeding mutant gram negative bacillus utilized in carrying forth this invention are: grows well on plain agar, MacConkey agar, E.M.B., blood agar and bile; does not grow on dextrose or brilliant green; grows on triple sugar iron agar without $H_2S$ gas production; shows slow motility on tryptose; grows both aerobically and anaerobically in nutrient agar; grows without lactose fermentation on either E.M.B. agar or MacConkey agar; growth of the organism in meat broth is slow but active; growth on E.M.B. is quite interesting in that photomicrographs show "chain" formation that is not apparent on bile agar or on smears from blood agar; growth on triple sugar iron agar apparently produces some slow fermentation of both lactose and sucrose; and no hemolysis occurs on blood agar and the responsible organism is apparently not pathoegnic as evidenced from in vivo tests by having been fed to horses, cattle and hogs.

The media utilized for the progagation of the Providence group of paracolon bacteria suitable for carrying forth the process of the present invention are all standard culture media such as are fully described in the Difco Manual of Dehydrated Culture Media and Reagents for Microbiological and Clinical Laboratory Procedures, 9th Edition, 1963, Difco Laboratories, Incorporated. The culturing of the responsible paracolon bacteria is carried forth under standard conditions, i.e. at a temperature of approximately 35–37° C., wherein, in the usual manner, growth continues to the limit of the food supply in the particular culture media being utilized. More particularly, a reasonably pure culture of the responsible paracolon bacterium, i.e., one that might contain *Bacillus subtilis* as a contaminant thereof, can be carried on nutrient agar, bile agar or blood agar plates. Working cultures of the paracolon bacterium can be prepared by transferring an inoculum from the aforementioned plates into a suitable broth such as meat infusion broth, for example, which is a well recognized general culture medium.

Briefly, the process of the present invention for the deodorization and digestion of sewage in accordance with the process of the present invention has been carried forth on a laboratory scale by inoculating paunch material, i.e. the partially digested material from the forestomach of cattle, with the responsible Providence organisms ATCC 21160 cultured in a nutrient broth. Over a period of approximately two weeks the material was deodorized by the biochemical action of the Providence organisms. In another laboratory procedure an inoculum of working culture broth was introduced into an admixture of animal fat in water, both with and without the presence of added detergent. The water mixture was kept at room temperature and aerated continuously by the utilization of a subsurface air injection bubbler. At the end of a two to three week interval it was observed that the fat in the mixture had been substantially decomposed in both test samples without the evolution of objectionable odors. Reculturing of material obtained from the deodorized samples by utilization of the differential media set forth hereinafter, to select an organism of the Providence group having the above delineated growth characteristics, resulted in the establishment of a culture which was utilized to carry forth the instant process for the deodorization and digestion of additional amounts of organic waste thereby establishing the fact that the responsible Providence paracolon organism does not undergo spontaneous mutation. Furthermore, it has been observed that pretreatment of waste material prior to inoculation with the Providence organism is not necessary inasmuch as the responsible organism is equally active in waste matter of both alkaline and acid reaction. In addition, it has been observed that continuous inoculation of a waste disposal system, such as a municipal waste disposal system, is not normally necessary and, in some cases, depending upon the loading of the system, may only be required on a thirty-day interval due to the Providence organism overgrowing and dying out in some sewage. As indicated above, recovery of viable Providence organisms from the effluent of material being treated indicates that the loss of activity is only a matter of overgrowth. The frequency of reinoculation of a waste disposal system with the Providence organisms is also somewhat dependent upon the initial loading of the system with the organism. An exemplary initial loading to provide adequate deodorization and digestion of waste material may comprise an inoculum of 0.5 billion bacteria per gallon of contaminant-containing material.

The present invention is described in more detail in the following examples which are, however, set forth merely by way of illustration and not by way of limitation. In fact, they can be modified in various ways, well-known to those versed in the art, without deviating from the spirit or scope of the invention as set forth in the specification and the appended claims.

EXAMPLE I

An organic waste matter deodorizing and digesting culture consisting of a true-breeding strain of gram negative bacilli of the Providence group of Enterobacteriaceae ATCC 21160 was established by conventional bacteriological procedures and evidenced the following general growth characteristics:

(1) grows well on nutrient agar, MacConkey agar, eosin methylene blue agar and bile agar;
(2) does not grow on dextrose agar or brilliant green agar;
(3) grows on triple sugar iron agar without hydrogen sulfide gas production;
(4) shows slow motility on tryptose motility test medium;
(5) grows aerobically on and anaerobically in nutrient agar;
(6) shows no lactose fermentation on either eosin methylene blue agar or MacConkey agar;
(7) growth in nutrient broth is slow but active;
(8) growth on eosin methylene blue agar is in chain formation, which chain formation is not evident in growth on bile agar or blood agar;
(9) growth on triple sugar iron agar produces some slow fermentation of both lactose and sucrose; and
(10) growth on blood agar is non-hemolytic.

The culture of the Providence paracolon bacterium ATCC 21160 was carried in the laboratory by the usual methods on nutrient agar, bile agar or blood agar. Transfers were accomplished by wire loop to inoculate tubes containing nutrient broth where the bacteria were grown under the usual 37° C. conditions, wherein growth continues to the limit of the food supply. The nutrient broth culture was then used to inoculate paunch material, obtained from the forestomach of cattle; this material was characterized by a pH of 4 or less and a highly disagreeable odor. The paunch material was cultured at room temperature and after several days the odor of the material was observed to be somewhat reduced and after approximately two weeks the odor of the cultured paunch mixture became negligible. Responsible organisms recovered from the cultured material were subsequently found to be still capable of effecting the deodorization of organic waste material.

EXAMPLE II

A pure culture of bacteria as set forth in Example I, and wherein the organisms were cultured in a nutrient broth, was inoculated into an admixture of animal fat in water which mixture was kept at approximately room temperature and aerated continuously by use of a sub-surface air injector. Within a period of approximately two to three weeks the fat was observed to be digested wherein the physical nature of the fat comprised a granular, deodorized precipitate which, although not completely soluble, can be readily transported in water without unduly clinging to the walls of conduits or the like.

EXAMPLE III

The broth culture of Providence organisms set forth in Example II was inoculated into an animal fat water admixture to which a minor amount of detergent had been added. Although, as would be expected, the detergent itself increased the solubility of the fat, the Providence organisms, as in the case of Example II, digested the fat to produce a partially soluble, deodorized, granular precipitate as noted in Example II.

EXAMPLE IV

A mass inoculation in a city sewer system was made using a solid feed material consisting of the Providence paracolon bacterium as set forth in Example I, and cultured in steer and/or chicken manure which had been effectively deodorized by the growth of the Providence organisms therein. Bacteriological analysis of the feed material shows only the presence of *Bacillus subtilis* and various ordinary enteric organisms which in themselves have shown none of the deodorizing properties, etc., ascribed herein to the Providence paracolon organisms. The sewer system treated has an average daily flow of three million gallons of waste. A portion of the flow for each day is contributed by the effluent from a meat packing plant. The load, i.e. amount of sewage, from the plant varies with the daily work load and, therefore, the amount of sewage from this source is sporadic and oftentimes comprises a significant proportion of the total daily flow of sewage into the city sewer system.

The sewer system was inoculated with approximately 1,000 pounds of the above-mentioned cultured organic material which was observed to have a Providence group ATCC 21160 bacterial concentration of about $1 \times 10^9$ bacteria per pound. The inoculation was made at a number of sewer mains near the outermost limits of sewage injection into the city system. This was done in order to inoculate as much of the city system as possible prior to entry of the sewage into municipal sewage treatment plant. Mass inoculation per unit flow was not attempted at the packing plant since the sporadic and violent flow of the packing plant effluent (traverse time of the effluent waste was less than 30 minutes from packing plant to city sewer plant) would negate any benefit which might be derived from the dwell of the inoculum in the sewer lines before entering into the sewer plant itself.

A number of tests were made at a variety of points at the sewage treatment plant prior to and two weeks after inoculation. It was estimated that the travel rate of the inoculum from the outermost points of injection would be at least two weeks before the individual bacterium would be identifiable in the treated effluent from the sewer plant. By coincidence, it turned out that at primary testing (before inoculation) the packing plant contribution to the system comprises 15% of the over-all flow of sewage, while at the second measurement, two weeks later, the packing plant effluent comprised greater than 30% of the flow of sewage during the 24 hour period of measurement.

The reductions noted in the following Table I are shown in terms of the absolute measurements which comprise a percentage of pre-inoculation measurement.

TABLE I

| Sewerage plant treatment sampling point | Percent of pre-Inoculation measurement | | | |
|---|---|---|---|---|
| | BOD | COD | Residue total | Solids total |
| Clarifier #1 | .65 | .87 | .84 | .60 |
| Clarifier #2 | .61 | .86 | .83 | .60 |
| Trickling filter | .72 | .93 | .79 | .60 |
| Secondary clarifier | .72 | .70 | .80 | .54 |
| Small lagoon | .27 | .50 | .63 | .39 |
| Settling pond | .46 | .56 | .65 | .55 |

If one considers the effect of the coincidental difference in the volume of effluent of the packing plant in the overall sewage flow in the light of the above information set forth in Table I, the percentage reduction of biological oxygen demand, chemical oxygen demand, etc. over that present prior to injection of the inoculum, may be further changed, since the packing plant contribution to the sewer system was twice as much post-inoculation as pre-inoculation and since where there is no effect of the bacterial inoculation on the packing plant sewage, due to the extremely short dwell time of the packing plant effluent in the sewerage lines, the percentage reductions indicated in Table I may be reduced. In this regard, the reduction factor is 0.70/0.85 or .8. Thus, the efficiency of the responsible Providence bacteria in reducing the BOD, COD, residue and total solids over this short period of measurement is about 50% on the average at the several sampling points within the city sewerage plant. At the main points of interest, the lagoon and settling pond, where obnoxious odors and undesirable filtering out of solids is most apt to occur, the efficiency of the Providence bacteria is approximately 70%. In addition to the above, the responsible mutant Providence bacteria has been identified in all samples collected post-injection and subsequent to the above-noted studies. Continued improvement in sewerage treatment plant operation has been noted since these studies and since re-inoculation of the system after 30 days of operation following the initial inoculation.

EXAMPLE V

A second large scale test was conducted on the meat packing plant mentioned in Example IV in an attempt to clear the non-edible fat discharge lines leading from the meat packing plant to a separate sewage lagoon not comprising a portion of the city sewerage system. The lines within the plant were seeded with a solid inoculum cultured as set forth in Example IV wherein approximately 30 lbs. of solid inoculum were used initially which comprised an inoculation of approximately 0.5 billion bacteria per gallon of animal fat containing waste. Within two weeks the mutant Providence organisms were observed to have digested substantially all the animal fat adhering to the inner walls of the in-plant sewage line leading to the sewage lagoon. Simultaneous with free flow of fat-containing waste into the lagoon was the appearance of the Providence organisms in samples of the supernatant of the lagoon. Clearance of the waste-fat line was maintained by re-inoculation every 30 days. It will thus be appreciated that the process of the present invention utilizing the Providence group of organisms, having the growth characteristics set forth in Example I, comprises an anti-pollutant for water-borne insoluble such as inedible fats and tallows. Furthermore, the process of the present invention comprises a means of bringing about the digestion of organic material without the evolution of obnoxious gaseous products and thus may also be considered to be an anti-pollutant means for air.

From the foregoing, and particularly the comparative data set forth in Table I it will be apparent that the process of the present invention, comprising the utilization of organisms of the Providence group of Enterobacteriaceae, having the growth characteristics set forth, provides a highly efficient, simple, relatively inexpensive means of facilitating the deodorization and digestion of waste material and more specifically waste material containing a significant proportion of animal fat or tallows.

The foregoing is considered to be merely illustrative of the manner of carrying forth the process of the present invention utilizing mutant organisms of the Providence group of Enterobacteriaceae ATCC 21160 for the treatment of waste matter and accordingly it will be apparent to those skilled in the art that modification of the method of this invention can be made and equivalents can be substituted without departing from the spirit of the invention.

What is claimed as new is as follows:

1. The process of effecting biodegradation and/or deodorization of waste matters which comprises inoculating the waste matter with a culture of viable mutant organisms ATCC 21160.

2. The process of claim 1 wherein the inoculum comprises in the order of 0.5 billion bacteria per gallon of waste matter.

3. The biochemical process of suppressing odors emanating from waste matter, comprising the steps of:
culturing mutant organisms of the Providence group of Enterobacteriaceae ATCC 21160 in a nutrient medium to produce a bacterially enriched medium having a relatively high number of viable Providence organisms per unit of mass; and
inoculating waste matter with the enriched medium to effect biochemical deodorization of the waste material by the Providence organisms.

4. The process of claim 3 wherein the inoculum comprises in the order of 0.5 billion bacteria per gallon of waste matter.

5. The biochemical process of digesting fatty substances in waste matter comprising the steps of:
culturing mutant organisms of the Providence group of Enterobacteriaceae ATCC 21160 in a nutrient medium to produce an enriched medium having a relatively high number of viable Providence organisms per unit of mass; and
inoculating fatty substance-containing waste material with the enriched medium whereby said organisms biochemically digest fatty substances in the waste matter.

6. The process of claim 5 wherein the inoculum comprises in the order of 0.5 billion bacteria per gallon of waste matter.

References Cited

FOREIGN PATENTS 886,585 1/1962 Great Britain _____ 210—7
1,299,104 6/1962 France _____ 210—11

OTHER REFERENCES

Stuart, C. A., et al., Biochemical and Antigenic Relationships of the Paracolon Bacteria, J. Bact., vol. 45, 1943, pp. 101, 111–114 and 117–119 relied on.

Jensen, L. B., Microbiology of Meats, second edit., 1945, Garrard Press, Champaign, Ill., pp. 56–58 relied on.

Bergey's Manual of Determinative Bacteriology, seventh edit., 1957, Williams & Wilkins Co., Baltimore, pp. 367 and 368 relied on.

MICHAEL ROGERS, Primary Examiner

U.S. Cl. X.R.

195—2